(12) United States Patent
Ogura

(10) Patent No.: US 8,284,641 B2
(45) Date of Patent: Oct. 9, 2012

(54) OPTICAL DISC APPARATUS

(75) Inventor: Masanori Ogura, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 186 days.

(21) Appl. No.: 12/585,975

(22) Filed: Sep. 30, 2009

(65) Prior Publication Data
US 2010/0080092 A1   Apr. 1, 2010

(30) Foreign Application Priority Data

Oct. 1, 2008  (JP) ................................. 2008-256492

(51) Int. Cl.
*G11B 7/00* (2006.01)

(52) U.S. Cl. ................ 369/44.25; 369/44.32; 369/44.28

(58) Field of Classification Search ........................ None
See application file for complete search history.

(56) References Cited

U.S. PATENT DOCUMENTS

2005/0243678 A1* 11/2005 Shime ........................ 369/59.12
2010/0080092 A1* 4/2010 Ogura ........................ 369/44.28

FOREIGN PATENT DOCUMENTS

JP   5-59611   8/1993
JP   2003-162834   6/2003

* cited by examiner

*Primary Examiner* — Joseph Haley
*Assistant Examiner* — Ifedayo Iluyomade
(74) *Attorney, Agent, or Firm* — McGinn IP Law Group, PLLC

(57) ABSTRACT

A simple circuit configuration allows an optical disc apparatus to reduce a problem of sound skips occurring due to damage on an optical disc. To this end, an LPF extracts a low-frequency component from a tracking actuator drive signal obtained by a tracking actuator driver. When the optical disc apparatus reads and writes information to and from the optical disc, a sled drive signal supplier outputs a sled pulse signal, as a drive signal for a sled motor, for a set-up predetermined time within each interval of a predetermined length, the sled pulse signal having a level corresponding to a level of the low-frequency component obtained by the LPF. On the other occasions, the sled drive signal supplier outputs the low-frequency component obtained by the LPF as the drive signal for the sled motor.

18 Claims, 7 Drawing Sheets

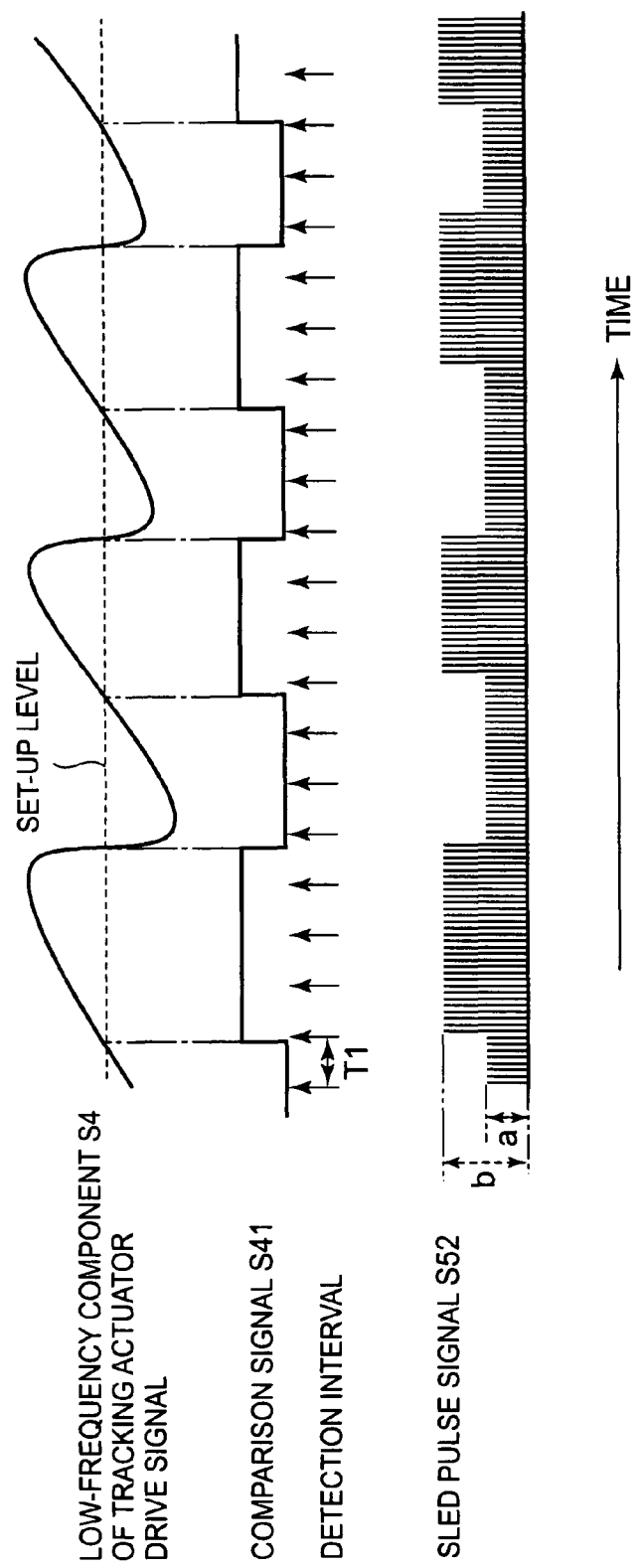

RELATED ART FIG. 6
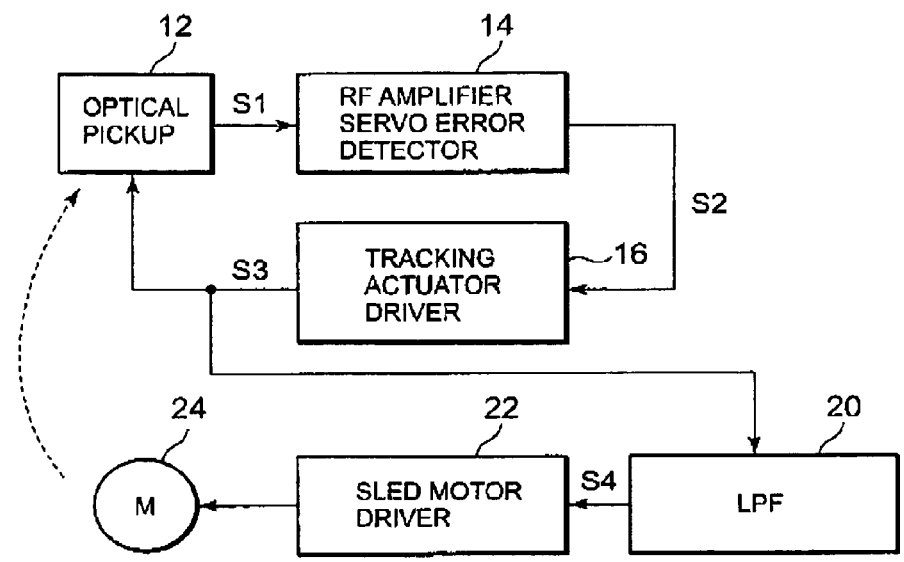
RELATED ART FIG. 7
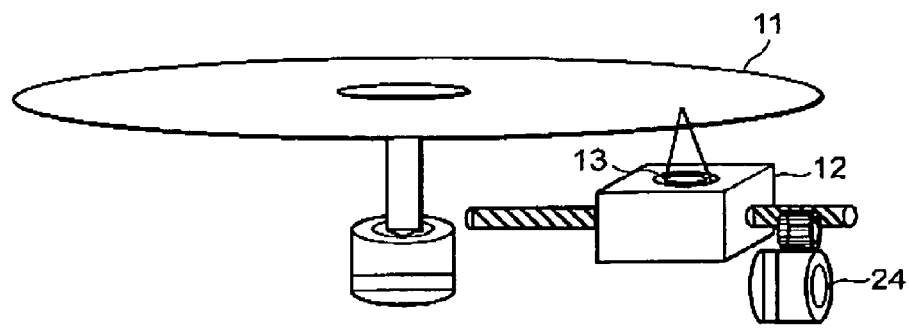

RELATED ART FIG. 8
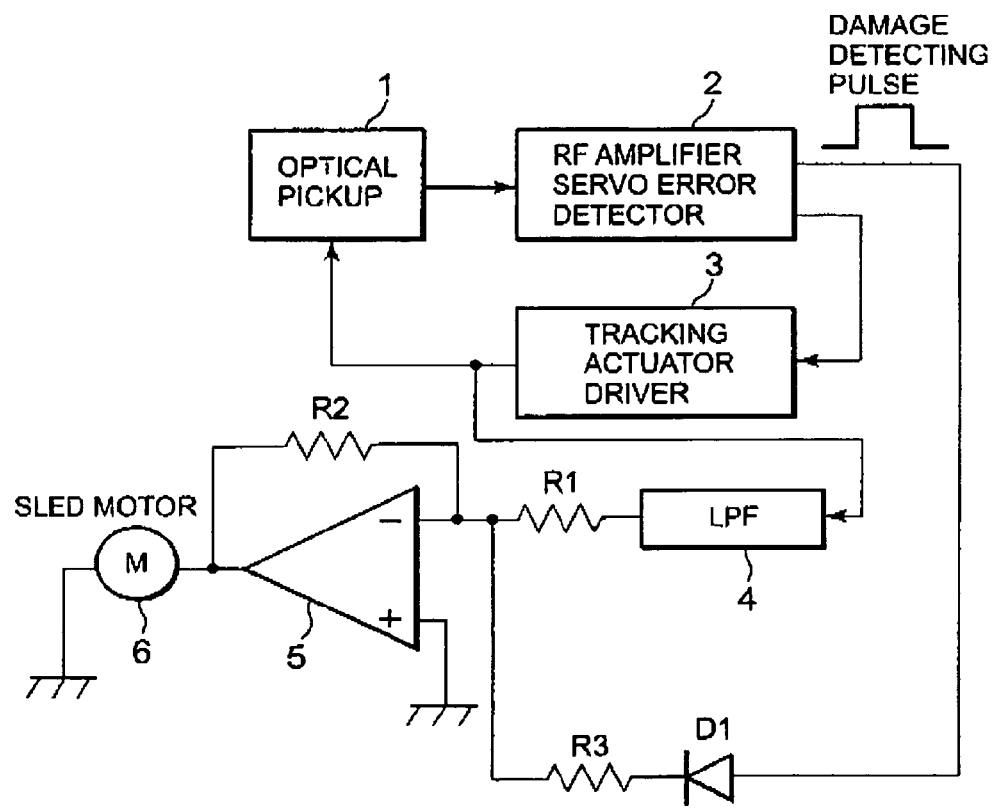

OPTICAL DISC APPARATUS

BACKGROUND OF THE INVENTION

1. Field of the Invention

The present invention relates to an optical disc apparatus, and particularly to an optical disc apparatus capable of avoiding a sound skip due to damage on an optical disc.

2. Description of the Related Art

An optical disc apparatus for recording, reproducing and erasing information by using an optical disc as a medium carries out tracking servo in which the position of a light beam irradiated from the optical pickup is corrected on the basis of a tracking error signal representing a positional displacement between the light beam and a target track in order that the light beam can always follow the target track. In addition, having a limitation in a movable range of the light beam, the optical disc apparatus also carries out a sled control of moving the optical pickup as a whole in a radial direction of the optical disc on the basis of a low-frequency component of the tracking error signal. Here, the tracking servo and the sled control are described with reference to FIGS. 6 and 7.

FIG. 6 is a schematic diagram used to explain tracking servo in the optical disc apparatus. An RF (radio frequency) amplifier servo error detector 14 detects a tracking error signal S2 on the basis of an RF signal 51 obtained from an optical pickup 12, and outputs the tracking error signal S2 to a tracking actuator driver 16. On the basis of the tracking error signal S2, the tracking actuator driver 16 generates a tracking actuator drive signal S3 for controlling the tracking position of the optical pickup 12, and outputs the tracking actuator drive signal S3 to the optical pickup 12 and a low-pass filter (hereinafter referred to as an "LPF") 20. The LPF 20 obtains a low-frequency component S4 of the tracking actuator driver signal S3, and outputs the low-frequency component S4 to a sled motor driver 22. The sled motor driver 22 drives a sled motor 24 on the basis of the low-frequency component S4. Thereby, the sled motor 24 revolves, and thus moves the optical pickup 12 in a radial direction of the optical disc.

FIG. 7 is a diagram showing an example of an actual configuration of an optical disc apparatus which carries out the tracking servo and the sled control. In FIG. 7, functional blocks identical to those shown in the schematic diagram of FIG. 6 are denoted by the same reference numerals.

As shown in FIG. 7, the optical pickup 12 includes an objective lens 13. The objective lens 13 is controlled in a way that the light beam from the optical pickup 12 can focus on an optical disc 11. The objective lens 13 has a certain movable range in the radial directions of the optical disc 11. The sled motor 24 is driven on the basis of the low-frequency component S4 of the unillustrated tracking actuator drive signal S3, and thus moves the optical pickup 12 as a whole in a radial direction of the optical disc 11.

Due to a static friction of the sled mechanism, the sled motor requires a drive voltage and time until the sled motor starts to operate. Accordingly, the objective lens 13 is not always in the center of its own movable range. Furthermore, in the case of optical disc apparatuses manufactured in mass production at low costs in recent years, the gear widths of the sled mechanism and the drive voltage of the sled motor vary due to a less strict performance standard. Against this background, the objective lens may be out of a central point of its own movable range in many optical disc apparatuses. If damage exists on an optical disc when the objective lens is out of the center of its movable range, the tracking servo tends to run off the track, and sound skips tend to occur.

Japanese Utility Model Application Laid-open Publication No. Hei 5-59611 (hereinafter referred to as "Patent Document 1") discloses a scheme for solving this problem. This scheme includes: detecting damage on an optical disc; generating a damage detection pulse in synchronism with the damage thus detected; and adding this damage detection pulse to the drive voltage of the sled motor. A description will be given with reference to FIG. 8 that is FIG. 1 of Patent Document 1.

In an optical disc apparatus shown in FIG. 8, an RF signal outputted from an optical pickup 1 is processed by an RF amplifier servo error detector 2 and a tracking actuator driver 3 and an LPF 4 to obtain a low-frequency component of a tracking actuator drive voltage. This low-frequency component is supplied to a non-inversion terminal of a sled motor driver 5 via a resistor R1. In addition, if the RF amplifier servo error detector 2 detects damage on the optical disc, a detection pulse (a damage detection pulse) synchronized with this damage is supplied to (injected into) the non-inversion input terminal of the sled motor driver 5 via a diode D1 and a resistor R3. By injecting the damage detection pulse into the output from the LPF 4, the sled motor 6 is driven with a voltage exceeding the static friction of the sled mechanism in each cycle of the damage. This enables the tracking actuator to be controlled so that the objective lens (not illustrated) of the optical pickup 1 can be situated at the center of the movable range. Consequently, even if the tracking servo runs off due to the damage, the tracking actuator does not undergo tension of the supporting mechanism. Thus, sound skips due to the damage rarely occur.

Japanese Patent Application Publication No. 2003-162834 (hereinafter referred to as "Patent Document 2") discloses a scheme for enhancing a track tracing performance which an optical disc apparatus exhibits when detecting a defect (equivalent to damage). This scheme includes generating a tracking feedback control signal (equivalent to the above-described tracking actuator drive signal) on the basis of a tracking error signal; holding a low-frequency component of the tracking feedback control signal; thus obtaining a tracking hold signal; and, immediately after detecting a defect, adding an eccentric correction signal, a reverse polarity signal and a tracking braking signal to the tracking hold signal obtained immediately before the defect detection. Here, the eccentric correction signal is a signal for offsetting an eccentric component of the optical disc or the optical disc apparatus at each rotational angle of the disc motor. The reverse polarity signal is a signal having polarity reverse to, and having amplitude twice as large as, a tracking feedback control signal generated before a predetermined time. The tracking braking signal is a signal for correcting an excessive response which the tracking actuator makes after the reverse polarity signal is added thereto. Thereby, it is possible to control an acceleration applied to the objective lens for compensating for delay in detecting the defect, and thereby to enhance the track tracing performance in the defect detection.

The scheme disclosed in Patent Document 1 has a problem that an excessive drive voltage is applied to the sled motor when the damage detection pulse has a wide width or is at a high level. This is because the sled motor is driven on the basis of the damage detection pulse synchronized with the damage on the optical disc which is detected by the RF amplifier servo error detector 2 shown in FIG. 7. As a result, the tracking actuator is not always controlled so that the objective lens can be situated in the center of the movable range, and thereby the problem of sound skips still tends to occur due to damage.

Setting aside the producible effects, the scheme disclosed in Patent Document 2 needs to: detect a defect; hold a tracking actuator drive signal; generate a reverse polarity signal and the tracking braking signal; and add of the reverse polarity signal and the tracking braking signal. For this purpose, the scheme requires complicated process, and an intricate circuit configuration.

SUMMARY

The present invention seeks to solve one or more of the above problems, or to improve upon those problems at least in part.

An aspect of the present invention is an optical disc apparatus using an optical disc as an information recording medium. This optical disc apparatus includes: an optical pickup; a tracking servomechanism that generates a tracking actuator drive signal on the basis of a tracking error signal obtained from the optical pickup, and controls a position of an objective lens included in the optical pickup; a sled motor that rotates and thereby moves the optical pickup in a radial direction; a low-pass filter that extracts a low-frequency component of the tracking actuator drive signal; and a sled drive signal supplier that outputs a sled pulse signal, as a drive signal for the sled motor, the sled pulse signal having a level corresponding to a level of the low-frequency component obtained by the low-pass filter.

Note that any optical disc system and any optical disc method into which the optical disc apparatus according to the above-described aspect is embodied are also effective as aspects of the present invention.

The technology pertaining to the present invention makes it possible for the optical disc apparatus to reduce a problem of sound skips due to damage on an optical disc by use of a simple circuit configuration.

BRIEF DESCRIPTION OF THE DRAWINGS

FIG. 5 shows an example of a timing chart which is used to explain how the sled drive signal supplier shown in FIG. 4 operates.

FIG. 6 is a schematic diagram of a conventional type of optical disc apparatus which controls its sled by use of a low-frequency component of a tracking actuator drive signal.

FIG. 7 is a diagram showing an example of a configuration of an optical disc apparatus corresponding to the schematic diagram of FIG. 6.

FIG. 8 is a diagram showing an optical disc apparatus disclosed in Patent Document 1.

DESCRIPTION OF THE PREFERRED EMBODIMENTS

First Embodiment

Figure 1:
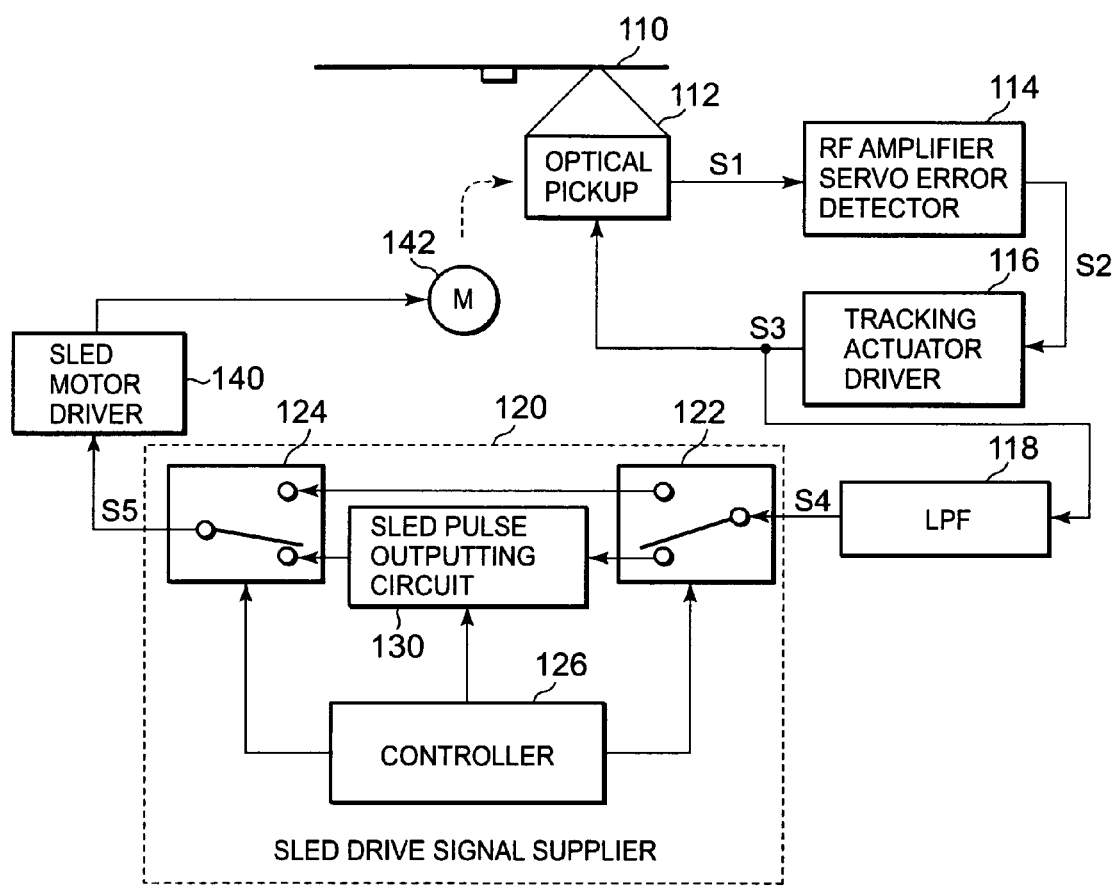
FIG. 1 is a diagram showing an optical disc apparatus according to a first embodiment of the present invention.

FIG. 1 shows an optical disc apparatus 100 according to a first embodiment of the present invention. The optical disc 100 includes an optical pickup 112, an RF amplifier servo error detector 114, a tracking actuator driver 116, an LPF 118, a sled drive signal supplier 120, a sled motor driver 140, and a sled motor 142. The sled drive signal supplier 120 is a component characteristic of the technology related to the present invention. The other functional blocks have the same functions as their counterparts in any regular optical disc apparatus have.

The optical pickup 112 is a component including: a source of light which is irradiated onto an optical disc 110; and a light receiver. The RF amplifier servo error detector 114 detects a tracking error signal S2 on the basis of an RF signal S1 which the optical pickup 112 obtains by receiving light reflected from the optical disc 110, and outputs the tracking error signal S2 to the tracking actuator driver 116. The tracking actuator driver 116 generates a tracking actuator drive signal S3 for controlling a tracking position of the optical pickup 112 on the basis of the tracking error signal S2, and outputs the tracking actuator drive signal S3 to the optical pickup 112 and the LPF 118. Note that a tracking servomechanism is constituted of the RF amplifier servo error detector 114, the tracking actuator driver 116 and a tracking actuator (not illustrated) included in the optical pickup 112.

The LPF 118 extracts a low-frequency component S4 of the tracking actuator drive signal S3, and outputs the low-frequency component S4 to the sled drive signal supplier 120. The sled drive signal supplier 120 receives the low-frequency component S4, and outputs a sled drive signal S5 to the sled motor driver 140. The sled motor driver 140 drives the sled motor 142 depending on the sled drive signal S5.

The sled drive signal supplier 120 includes a first switch 122, a second switch 124, a controller 126 and a sled pulse outputting circuit 130. The controller 126 controls the other functional blocks.

The first switch 122 is connected to the LPF 118. The second switch 124 is connected to the sled motor driver 140. The sled pulse outputting circuit 130 is placed between the first switch 122 and the second switch 124.

The first switch 122 and the second switch 124 carry out their respective switching operations in accordance with control of the controller 126. To put it specifically, when information is read from the optical disc 110, and when information is written to the optical disc 110, the first switch 122 carries out its switching operation in order that the low-frequency component S4 from the LPF 118 should be inputted into the sled pulse outputting circuit 130, whereas the second switch 124 carries out its switching operation in order that a sled pulse signal outputted from the sled pulse outputting circuit 130 should be inputted into the sled motor driver 140. On the other hand, when a piece of music is selected, and when the optical disc is accessed, the first switch 122 and the second switch 124 carries out their respective switching operations in order that the low-frequency component S4 from the LPF 188 should be directly inputted into the sled motor driver 140. Hereinafter, out of the two switching directions of the first switch 122 and the second switch 124, the former switching direction is referred to as a "first switching direction," and the latter switching direction is referred to as a "second switching direction."

Figure 2:
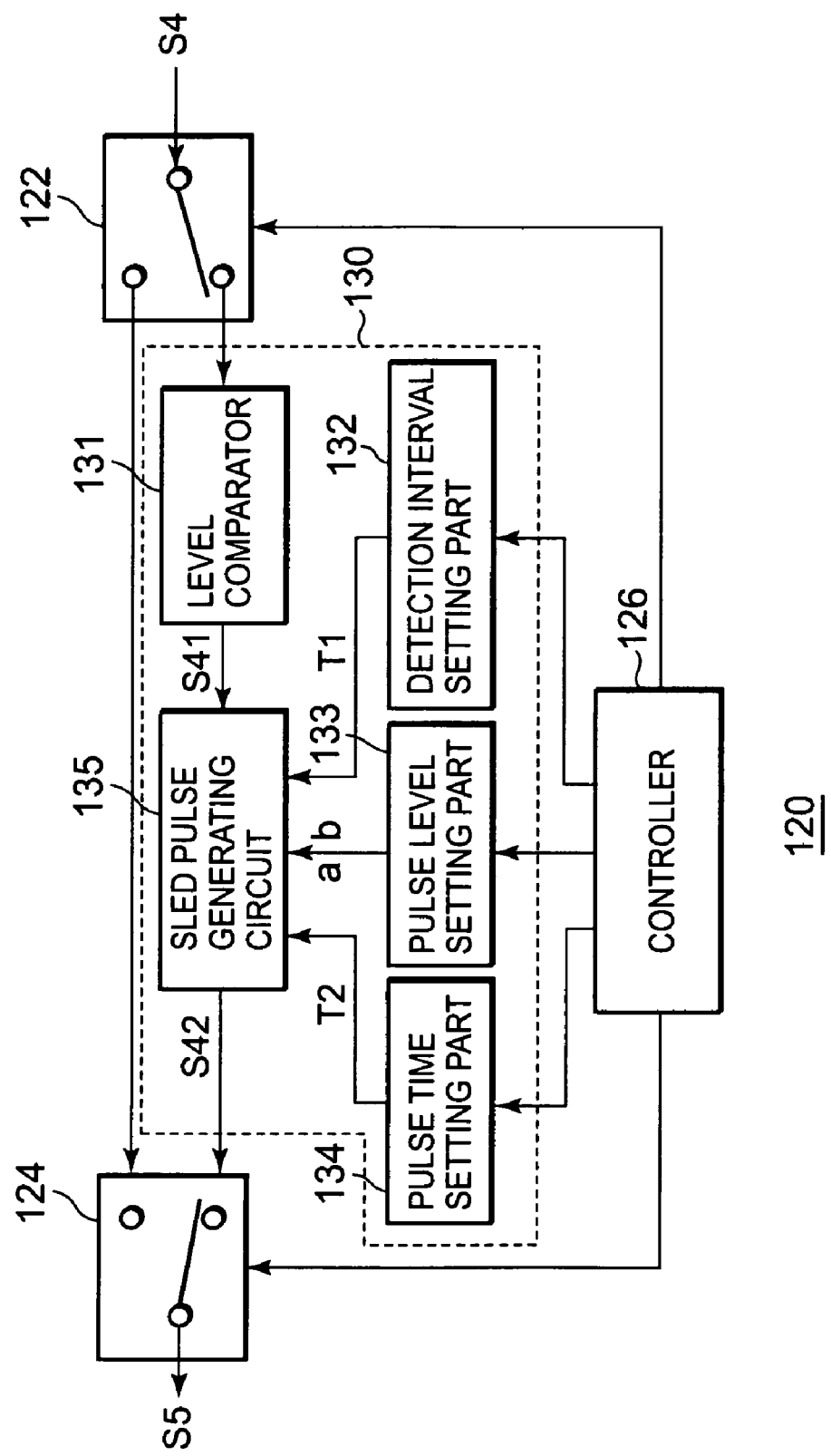
FIG. 2 is a diagram showing a sled drive signal supplier included in the optical disc apparatus shown in FIG. 1.

FIG. 2 shows the sled drive signal supplier 120, including the detailed configuration of the sled pulse outputting circuit 130. As shown in FIG. 2, the sled pulse outputting circuit 130 operates when the first switch 122 and the second switch 124 are turned in the first switching direction. The sled pulse outputting circuit 130 includes a level comparator 131, a detection interval setting part 132, a pulse level setting part 133, a pulse time setting part 134 and a pulse generating circuit 135.

The level comparator 131 compares the level of the low-frequency component S4 from the LPF 118 with the predetermined level which is beforehand set (hereinafter referred to as a "set-up level"), and outputs a binary comparison signal S41 to the pulse generating circuit 135. This comparison signal S41 is at L (low) level, when the level of the low-frequency component S4 is lower than the set-up level. The comparison signal S41 is at H (high) level, when the level of the low-frequency component S4 is equal to, or higher than, the set-up level.

The detection interval setting part 132 sets, in the pulse generating circuit 135, a detection interval T1 for detecting the condition of the comparison signal S41. The pulse level setting part 133 sets, in the pulse generating circuit 135, either of two levels (a low level a and a high level b) which a pulse generated by the pulse generating circuit 135 should take. The pulse time setting part 134 sets, in the pulse generating circuit 135, a pulse time T2 (T2≦T1) for which the pulse generating circuit 135 should continue to output the pulse.

Figure 3:
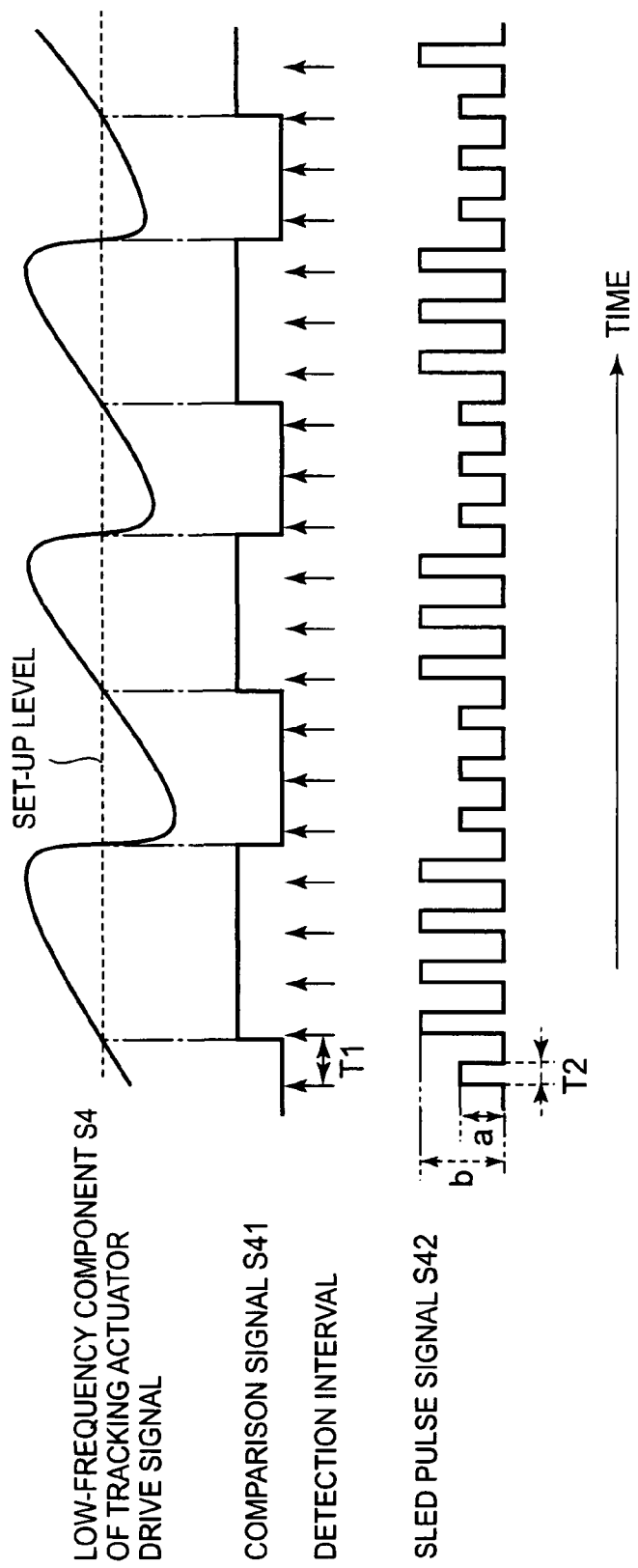
FIG. 3 shows an example of a timing chart which is used to explain how the sled drive signal supplier shown in FIG. 2 operates.

The pulse generating circuit 135 detects the condition of the comparison signal S41 at detection intervals T1 set by the detection interval setting part 132, and to generate the pulse at either of the two levels set by the pulse level setting part 133 on the basis of a result of the detection. To put is specifically, when the comparison signal S41 is at L level, the pulse generating circuit 135 outputs the pulse at low level a. When the comparison signal S41 is at H level, the pulse generating circuit 135 outputs the pulse at high level b. In addition, the pulse generating circuit 135 outputs the pulse for a length of the pulse time T2 set by the pulse time setting part 134:

FIG. 3 shows an example of a timing chart which is used to provide detailed explanation of how the sled drive signal supplier 120 operates. As shown in FIG. 3, the comparison signal S41 generated by the level comparator 131 is at L level, when the low-frequency component S4 is lower than the set-up level. The comparison signal S41 thus generated is at H level, when the low-frequency component S4 is equal to, or higher than, the set-up level. The pulse generating circuit 135 detects the condition of the comparison signal S41 at detection intervals T1. Each time the pulse generating circuit 135 detects the condition of the comparison signal S41, the pulse generating circuit 135 generates the sled pulse signal S42, and outputs the sled pulse signal S42 for the length of the pulse time T2. In other words, the pulse width is the pulse time T2. Note that the level of the sled pulse signal S42 is low level a when the comparison signal S41 is at L level, whereas the level of the sled pulse signal S42 is high level b when the comparison signal S41 is at H level.

As the sled drive signal S5, the sled pulse signal S42 generated by the pulse generating circuit 135 is outputted to the sled motor driver 140.

In sum, when the optical disc apparatus 100 according to the present embodiment reads information from the optical disc 110, and when the optical disc apparatus 100 writes information to the optical disc 110, the sled motor 142 is driven by the sled pulse signal S42 which has a level corresponding to the level range of the low-frequency component S4 of the tracking actuator drive signal S3, and which is outputted for the predetermined time length (the pulse time T2) within the detection interval T1 for each detection interval T1. Thereby, an objective lens (not illustrated) included in the optical pickup 112 is always situated in a vicinity of the center position of its movable range. This allows the optical disc apparatus 100 to avoid a problem that sound skips tends to occur in a case where the optical disc 110 is damaged.

Furthermore, the circuit configuration is simple.

Moreover, in the case where sound skips may be left out of consideration while the optical disc apparatus 100 according to the present embodiment does things such as selecting a piece of music and accessing the optical disc 110, the optical disc apparatus 100 drives the sled motor 142 by inputting the low-frequency component of the tracking actuator drive single S3 to the sledmotor driver 140 directly. Accordingly, the optical disc apparatus 100 is capable of reducing the power consumption of the sled drive signal supplier 120 to a minimum.

Second Embodiment

A second embodiment of the present invention relates to another optical disc apparatus. This optical disc apparatus is identical to the optical disc apparatus 100, except that its sled drive signal supplier is different from the sled drive signal supplier 120 shown in FIG. 2. With regard to the optical disc apparatus according to the second embodiment, descriptions will be provided only for a sled drive signal supplier 220 corresponding to the sled drive signal supplier 120 included in the optical disc apparatus 100.

Figure 4:
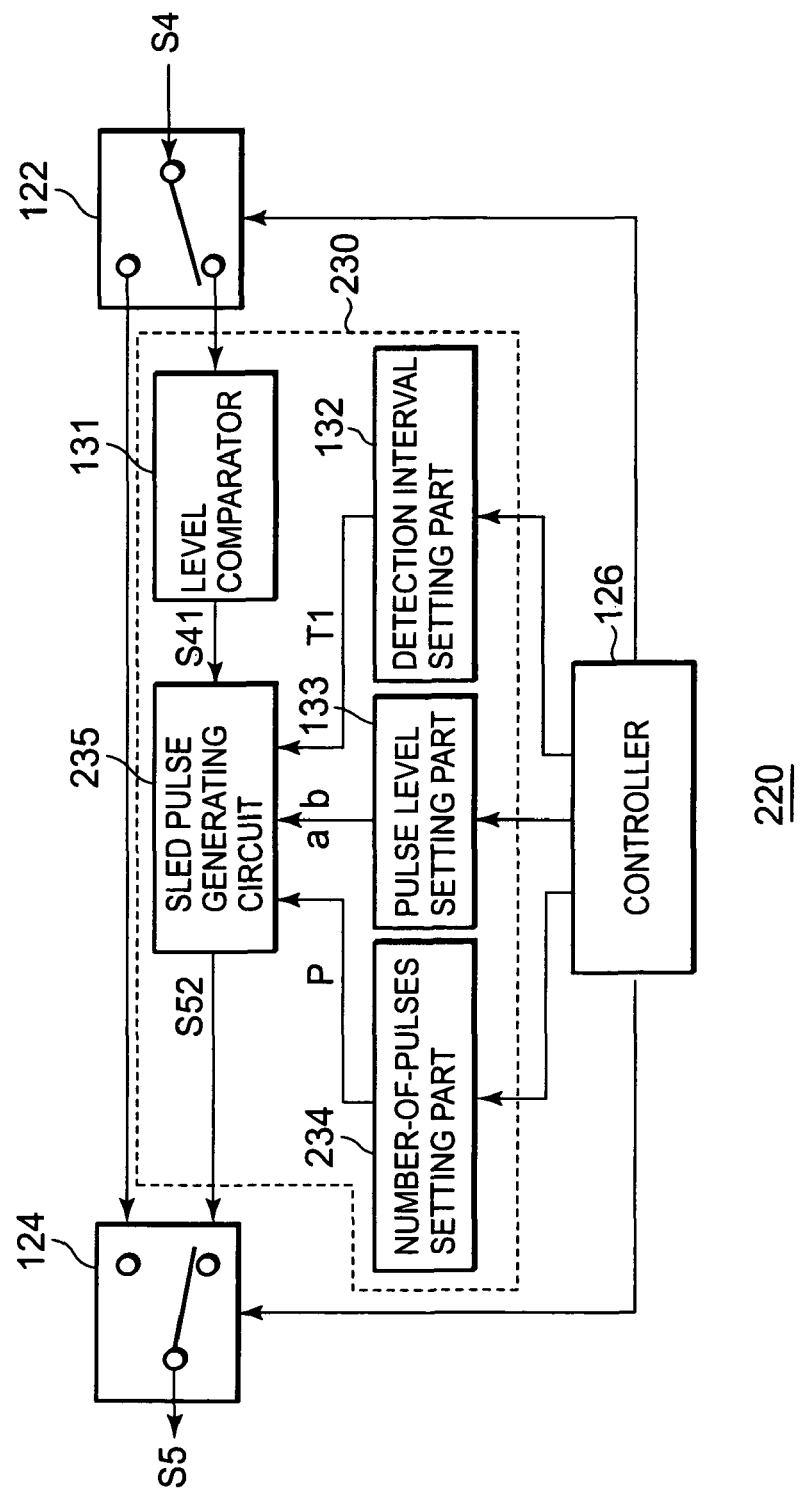
FIG. 4 is a diagram showing a sled drive signal supplier included in an optical disc apparatus according to a second embodiment of the present invention.

FIG. 4 shows the sled drive signal supplier 220 included in the optical disc apparatus according to the second embodiment of the present invention. In FIG. 4, components having the same configurations or functions as those included in the sled drive signal supplier 120 shown in FIG. 2 will be denoted by the same reference numerals.

The sled drive signal supplier 120 includes the first switch 122, a sled pulse outputting circuit 230, the second switch 124 and the controller 126. The sled pulse outputting circuit 230 includes the level comparator 131, the detection interval setting part 132, the pulse level setting part 133, a number-of-pulses setting part 234 and a sled pulse generating circuit 235.

Except that the sled pulse outputting circuit 230 included in the sled drive signal supplier 220 is different from the sled pulse outputting circuit 130 included in the sled drive signal supplier 120, the other functional blocks included in the sled drive signal supplier 220 are identical to those included in the sled drive signal supplier 120.

The sled pulse outputting circuit 230 includes the number-of-pulses setting part 234 instead of the pulse time setting part 134 included in the sled pulse outputting circuit 130. The level comparator 131, the detection interval setting part 132 and the pulse level setting part 133 included in the sled pulse outputting circuit 230 are identical to those included in the sled pulse outputting circuit 130. The sled pulse generating circuit 235 generates pulses each with a beforehand set-up width.

The number-of-pulses setting part 234 sets, in the sled pulse generating circuit 235, the number of pulses (number P of pulses) to be outputted for the detecting interval T1 set by the detection interval setting part 132.

FIG. 5 shows an example of a timing chart which is used to provide detailed explanation of how the sled drive signal supplier 220 operates. As shown in FIG. 5, the comparison signal S41 generated by the level comparator 131 is at L level, when the low-frequency component S4 is lower than the set-up level. The comparison signal S41 thus generated is at H level, when the low-frequency component S4 is equal to, or higher than, the set-up level. The pulse generating circuit 135 detects the condition of the comparison signal S41 at detection intervals T1, and outputs as many pulses as the number (number P of pulses) set by the number-of-pulses setting part 234 for each detection interval T1. The level of this pulse signal S52 is low level a, when the comparison signal S41 is at L level. The level of the sled pulse signal S52 is high level b, when the comparison signal S41 is at H level.

As the sled drive signal S5, the sled pulse signal S52 generated by the pulse generating circuit 235 is outputted to the sled motor driver 140.

In sum, when the optical disc apparatus according to this embodiment reads and writes information from and to the optical disc 110, the sled motor 142 is driven by the sled pulse signal S52 which has a level corresponding to the level of the low-frequency component S4 of the tracking actuator drive signal S3, and which is outputted as the predetermined number of pulses (number P of pulses) within each detection interval T1. Thereby, an objective lens (not illustrated) included in the optical pickup 112 is always situated in a vicinity of the center position of its movable range. This makes it possible for the optical disc apparatus to avoid a problem that sound skips tend to occur in a case where the optical disc 110 is damaged.

The optical disc apparatus according to the second embodiment is capable of obtaining the same effects as the optical disc apparatus 100 according to the first embodiment from the viewpoint of the circuit configuration and power consumption.

The foregoing descriptions have been provided for the present invention on the basis of the embodiments. However, the embodiments merely exemplify the present invention. The present invention may be variously modified, simplified, or sophisticated as long as such modification, simplification and sophistication do not deviate from the scope and spirit of the present invention. It is understood by those skilled in the art that any example of the present invention which can be obtained by modifying, simplifying or sophisticating the present invention shall be within the scope of the present invention.

For instance, in the two foregoing embodiments, the sled pulse signal is generated at either of the two different levels depending on the level of the low-frequency component S4 of the tracking actuator drive single S3, and the sled pulse motor is driven by this sled pulse signal. Instead, however, the sled pulse signal may be generated at one of any desired number of different levels (the number is two or more).

Furthermore, the first and second embodiments may be combined to configure the sled pulse outputting circuit to output exactly the set-up number of pulses (number P of pulses) within the set-up pulse time T2, and thereby to enhance control precision of the sled motor.

What is claimed is:

1. An optical disc apparatus using an optical disc as an information recording medium, said optical disc apparatus comprising:
    an optical pickup;
    a tracking servomechanism that generates a tracking actuator drive signal on a basis of a tracking error signal obtained from the optical pickup, and controls a position of an objective lens included in the optical pickup;
    a sled motor that rotates and thereby moves the optical pickup in a radial direction;
    a low-pass filter that extracts a low-frequency component of the tracking actuator drive signal; and
    a sled drive signal supplier that compares a level of the low-frequency component with a predetermined level to generate a sled pulse signal for controlling a sound skip of the optical disc, and outputs the sled pulse signal as a drive signal for the sled motor, the sled pulse signal having a level corresponding to the level of the low-frequency component,
    wherein the sled drive signal supplier comprises:
        a comparator that compares the level of the low-frequency component with the predetermined level;
        a pulse level setting circuit that selects a first pulse level based on a result of the comparing indicating that the level of the low-frequency component is lower than the predetermined level, and selects a second pulse level based on the result of the comparing indicating that the level of the low-frequency component is equal to, or higher than the predetermined level, the second pulse level being higher than the first pulse level;
        a pulse generating circuit that generates the sled pulse signal having the level corresponding to a result of the selecting by the pulse level setting circuit; and
    a terminal outputting the drive signal, and
    wherein the optical disc apparatus further comprises a control circuit that switches a connection route between the low-pass filter and the terminal, the connection route including a first connection route indicating a route between the low-pass filter and the terminal includes the pulse generating circuit, and a second connection route indicating the route between the low-pass filter and the terminal does not include the pulse generating circuit.

2. The optical disc apparatus according to claim 1, wherein the sled drive signal supplier outputs the sled pulse signal when information is read from and written to the optical disc, and
    wherein the sled drive signal supplier outputs the low-frequency component obtained by the low-pass filter, as the drive signal for the sled motor, except when information is read from and written to the optical disc.

3. The optical disc apparatus according to claim 1, wherein the sled drive signal supplier outputs the sled pulse signal within each interval of a predetermined length, the sled pulse signal having a predetermined number of pulses each having a same width.

4. The optical disc apparatus according to claim 3, wherein the sled drive signal supplier outputs the sled pulse signal for a predetermined time within each interval of the predetermined length.

5. The optical disc apparatus according to claim 1, wherein the level of the sled pulse signal varies depending on a level range of the low-frequency component.

6. The optical disc apparatus according to claim 1, wherein the level of the sled pulse signal becomes higher as one of the level of the low-frequency component and a level range of the low-frequency component becomes higher.

7. The optical disc apparatus according to claim 1, wherein the drive signal comprises the sled pulse signal when the connection route comprises the first connection route, and
    wherein the drive signal comprises the low-frequency component obtained by the low-pass filter when the connection route comprises the second connection route.

8. The optical disc apparatus according to claim 7, wherein the control circuit switches the connection route to the first connection route while information is read from and written to the optical disc, and
    wherein the control circuit switches the connection route to the second connection route, except while information is read from and written to the optical disc.

9. The optical disc apparatus according to claim 8, wherein the control circuit switches the connection route to the second connection route, while information of the optical disc is selected.

10. The optical disc apparatus according to claim 1, wherein the sled drive signal supplier outputs the sled pulse signal for a predetermined time within each interval of a predetermined length.

11. An optical disc apparatus using an optical disc as an information recording medium, said optical disc apparatus comprising:
    a sled motor that rotates to move an optical pickup in a radial direction;

a tracking servomechanism that generates a tracking actuator drive signal on a basis of a tracking error signal obtained from the optical pickup;

a low-pass filter that extracts a low-frequency component of the tracking actuator drive signal;

a sled drive signal supplier that comprises a terminal outputting a drive signal generated based on the low-frequency component, and further comprises a sled pulse outputting circuit that compares a level of the low-frequency component with a predetermined level to generate a sled pulse signal having a level corresponding to the level of the low-frequency component;

a sled motor driver that drives the sled motor based on the drive signal; and a control circuit that switches a connection route between the low-pass filter and the terminal, the connection route including a first connection route indicating a route between the low-pass filter and the terminal includes the sled pulse outputting circuit, and a second connection route indicating the route between the low-pass filter and the terminal does not include the sled pulse outputting circuit.

12. The optical disc apparatus according to claim 11, wherein the drive signal comprises the sled pulse signal when the connection route comprises the first connection route, and wherein the drive signal comprises the low-frequency component obtained by the low-pass filter when the connection route comprises the second connection route.

13. The optical disc apparatus according to claim 11, wherein the control circuit switches the connection route to the first connection route while information is read from and written to the optical disc, and wherein the control circuit switches the connection route to the second connection route, except while information is read from and written to the optical disc.

14. The optical disc apparatus according to claim 13, wherein the control circuit switches the connection route to the second connection route, while information of the optical disc is selected.

15. The optical disc apparatus according to claim 11, wherein the sled pulse outputting circuit comprises:

a comparator that compares the level of the low-frequency component with the predetermined level;

a pulse level setting circuit that selects a first pulse level based on a result of the comparing indicating that the level of the low-frequency component is lower than the predetermined level, and selects a second pulse level based on the result of the comparing indicating that the level of the low-frequency component is equal to, or higher than the predetermined level, the second pulse level being higher than the first pulse level; and a pulse generating circuit that generates the sled pulse signal having the level corresponding to a result of the selecting by the pulse level setting circuit.

16. The optical disc apparatus according to claim 15, further comprising:

a first switch that connects with the low-pass filter; and a second switch that connects with the terminal, wherein the control circuit controls the first switch so as to connect the low-pass filter with the sled pulse outputting circuit, and controls the second switch so as to connect the sled pulse outputting circuit with the terminal to switch the connection route to the first connection route, and wherein the control circuit controls the first switch and the second switch such that the low-pass filter bypasses the sled pulse outputting circuit to connect with the terminal to switch the connection route to the second connection route.

17. The optical disc apparatus according to claim 11, wherein the sled pulse signal is applied in controlling a sound skip of the optical disc.

18. The optical disc apparatus according to claim 11, wherein the drive signal for the sled motor is generated based on the low-frequency component in the first connection route and the second connection route.

* * * * *